Jan. 26, 1954  A. SCHOENWALD  2,667,561
ELECTRIC SOLDERING IRON
Filed April 3, 1952
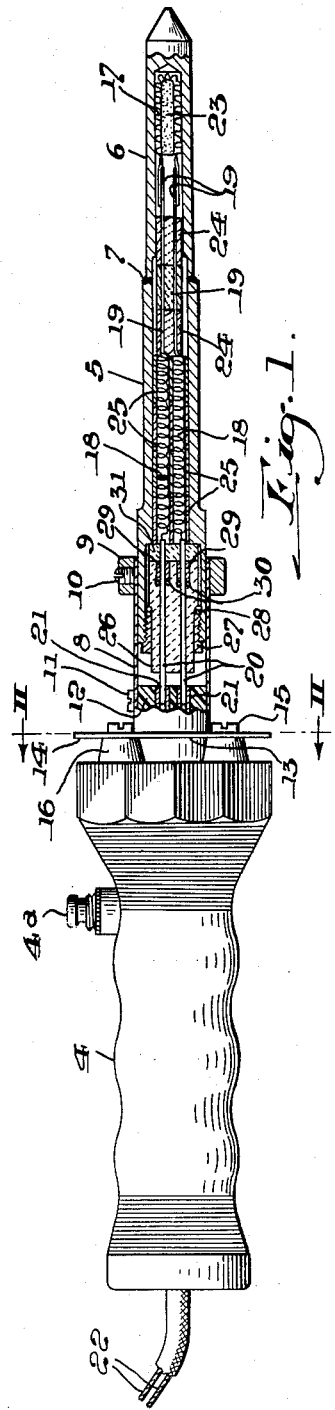
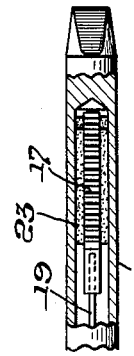
INVENTOR.
ALEXANDER SCHOENWALD Patented Jan. 26, 1954

2,667,561

UNITED STATES PATENT OFFICE 2,667,561

ELECTRIC SOLDERING IRON

Alexander Schoenwald, Grove City, Pa., assignor to P. Wall Mfg. Company, Grove City, Pa., a corporation of Pennsylvania Application April 3, 1952, Serial No. 280,242

3 Claims. (Cl. 219—26)

My invention relates to electrical soldering irons and is particularly suitable for use as a hand tool, wherein a handle may have wired connection with an electrical line and carries, at its forward end, a welding tip that is internally heated by means of an electrical resistor element.

One object of my invention is to provide an electric iron of the character referred to, wherein the welding tip will not become heated above a desired degree, but will be maintained at a somewhat uniform degree of heat after it has been brought up to operating temperature, thereby avoiding the use of thermally-actuated switches such as those of the bimetallic type, the use of which not only results in some fluctuations in temperature, but they may also interfere with radionic devices.

Another object of my invention is to provide a heating element in a welding-iron tip that will more rapidly effect heat transfer from the resistance element to the tip, both by conduction and by radiation.

Still another object of my invention is to provide a soldering iron structure which, while it has simplicity of design, is readily adaptable, even in the field, to use with both large and small heating elements, through a simple arrangement that permits substitution of tips of various capacities and conductors of various resistances, as well as substitution of complete units that comprise holders, tips, resistor conductors and resistance heating elements.

A further object of my invention is to provide an assembly of soldering iron parts that are readily connectible and disconnectible with respect to a handle, to permit of substitutions and replacements, and wherein provision is made for excluding moisture from the exterior of the holder for the tip.

Still a further object of my invention is to provide a welding torch structure wherein the resistors and their associated conductors are encased in clay-like insulating members, the members being divided into longitudinally aligned sections, to thereby reduce danger of shattering or breaking of clay-like insulators, and consequent avoidance of short circuiting or grounding of electrical current within the holder.

Figure 1 is a longitudinal sectional view through the soldering iron; Fig. 2 is a view taken on the line II—II of Fig. 1, and Fig. 3 is an enlarged sectional view through a portion of the tip of Fig. 1.

The iron can be used with either A. C. or D. C. current, and the structure comprises a handle 4 of conventional form, a tip holder 5 and a tip 6 welded thereto at 7, so that worn tips can readily be replaced, by breaking the weld 7 and attaching a new tip. The holder 5 extends into a sleeve 8 and is connected thereto by a collar 9 and a set screw 10. A set screw 11 connects the sleeve 8 to an insulator block 12 that has a shoulder 13 which is engaged by a disc 14 which is connected to the handle 4 by screws 15. Studs 16 are interposed between the disc 14 and the handle, to provide an air space across which heat will not be radiated readily to the handle.

The heating element proper comprises a crimped ribbon 17 of high heat resistance, such as a chrome alloy. Coiled resistance wires 18 that may be of nickel alloy or some pure metal which has a higher temperature coefficient than the ribbon, have straight portions 19 welded or soldered to the ribbon 17, and at their rear ends, are welded to terminal rods 20 which serve as plugs for sockets 21. The sockets have connection through a switch 4a with conductor wires 22. When the set screw 10 is loosened, the tip structure can be withdrawn from the sleeve 8. Other wires of different conductivities and heating capacities can thus readily be substituted.

The ribbon 17 extends around the outer end of a clay core 23 and lies against flattened sides of such core. The various crimps or pleats in the ribbon have direct engagement with the inner surface of the tip 6, at many points, to thereby more effectively conduct heat to the tip. Also, the greatly increased radiating area afforded by the crimps result in rapid heat transfer through radiation.

The stem portions 19 of the resistors 18 extend through clay bars 24 of relatively short length. The coils 18 are disposed in four tube-like clay members 25 that have central partitions and are arranged in end-to-end relation. As heretofore indicated, the making of the members 24 and 25 in transversely-divided sections will greatly reduce danger of these clay insulating members being shattered through impacts of the torch, as when it falls to a floor or is struck against a solid object. Short circuiting and grounding of current is thus avoided.

The terminal members 20 extend through a clay bushing 26 that is held in place on the holder 5 by a gland 27 which is screw-threaded into the holder 5. Packing 28 of asbestos yarn or other suitable material is contained at the inner end of the gland 27, to seal against entry of moisture into the holder 5. Metal bushings 29 are contained within recesses in the block and serve to compress packing cords 30 and thus prevent seepage of water along the terminal bars 20 to the interior of the structure. The bushings are held in place by a clay washer 31.

The ribbon resistor 17 will quickly bring the tip 6 to soldering temperature. The tip will be maintained at a desired temperature, because as the ribbon 17 and the helical coils 18 become heated, there will be increased resistance by the coils to the flow of current, thus preventing excessive heating of the ribbon resistor. This is a result of making the coils of metal which has a higher temperature coefficient than the ribbon, and therefore offers gradually increasing resistance to the flow of electrical current, until an equilibrium is reached as between power and temperature, thus giving an approximately thermostatic control without needing any moving parts.

By increasing or decreasing the lengths of the helices 18 relative to the sizes of the ribbon 17, a desired difference in temperature will be attained in the tip 6, for various classes of work. Also, where quick heating is desired, the helices will be made shorter, to reduce resistance to flow of current to the element 17.

I claim as my invention:

1. An electrical soldering iron comprising a tubular holder, a soldering tip carried by the forward end of the holder, insulating members within the holder and having perforations extending longitudinally thereof, conductor members protruding from the rear end of the insulating members, at the rear end of the holder, a resistance-type heating element enclosed within the tip, and conductors within the perforations and connecting the first-named conductor elements to the resistance heating element, the said element being of ribbon form pleated crosswise.

2. An electrical soldering iron comprising a tubular holder, a soldering tip carried by the forward end of the holder, insulating members within the holder and having perforations extending longitudinally thereof, conductor members protruding from the rear end of the insulating members, at the rear end of the holder, a resistance-type heating element in the tip, and resistance coils in the said perforations and connecting the conductors in series with the heating element, the coils being of higher temperature coefficient than the heating element, and the heating element having pleats formed crosswise therein, and the outer folds of the pleats having direct engagement with the inner wall of the tip.

3. An electrical heating device comprising a holder having a cylindrical cavity, a tip therefor, conductors in the holder, a clay insulating resistor core fitting into the cavity but having flattened areas on opposite sides, and a heating element of ribbon form with crosswise pleats that also extend crosswise of the core, the element being bent around the forward end of the core and having its rearwardly-disposed ends respectively connected to said conductors.

ALEXANDER SCHOENWALD.

References Cited in the file of this patent

UNITED STATES PATENTS

| Number | Name | Date |
|---|---|---|
| 563,715 | Grutting | July 7, 1896 |
| 915,974 | Leonard | Mar. 23, 1909 |
| 973,592 | Van Aller | Oct. 25, 1910 |
| 1,279,321 | Gardner | Sept. 17, 1918 |
| 1,660,920 | Fanger | Feb. 28, 1928 |
| 1,994,994 | Hampton | Mar. 19, 1935 |
| 2,064,645 | Abbott | Dec. 15, 1936 |
| 2,464,147 | Myers | Mar. 8, 1949 |
| 2,488,477 | Rapaport | Nov. 15, 1949 |
| 2,515,781 | Lennox | July 18, 1950 |